United States Patent [19]

Sakai et al.

[11] Patent Number: 5,787,653
[45] Date of Patent: Aug. 4, 1998

[54] SHEET-SHAPED SOLAR MODULE MOUNTING STRUCTURE

[75] Inventors: Norikazu Sakai, Tokyo; Yukimi Ichikawa; Takashi Yoshida, both of Kawasaki, all of Japan

[73] Assignees: Misawa Homes Co., Ltd., Tokyo; Fuji Electric Co., Ltd., Kanagawa, both of Japan

[21] Appl. No.: 747,643

[22] Filed: Nov. 13, 1996

[30] Foreign Application Priority Data

Nov. 14, 1995 [JP] Japan ................................ 7-295548

[51] Int. Cl.⁶ ............................................. F04D 13/18
[52] U.S. Cl. .................... 52/173.3; 52/506.01; 126/623; 136/244; 136/251
[58] Field of Search .................. 52/1, 173.1, 173.3, 52/506.01, 506.06, 508; 126/621, 622, 623; 136/249, 245, 291, 251, 246

[56] References Cited

U.S. PATENT DOCUMENTS

| | | | |
|---|---|---|---|
| 3,937,208 | 2/1976 | Katz et al. | 126/623 X |
| 4,010,733 | 3/1977 | Moore | 126/621 X |
| 4,393,859 | 7/1983 | Marossy et al. | 126/623 X |
| 4,860,509 | 8/1989 | Laaly et al. | |
| 4,942,865 | 7/1990 | Pierce-Bjorklund | 52/173.3 X |
| 5,092,939 | 3/1992 | Nath et al. | 52/173.3 X |
| 5,409,549 | 4/1995 | Mori | 52/173.3 X |
| 5,509,973 | 4/1996 | Ishikawa et al. | 52/173.3 X |

*Primary Examiner*—Beth Aubrey
*Attorney, Agent, or Firm*—Pearne, Gordon, McCoy and Granger LLP

[57] ABSTRACT

In a sheet-shaped solar module mounting structure, rail members include locking members to which the end portions of sheet-shaped solar batteries are locked, so that, in mounting the sheet-shaped solar batteries to a roof bed, it is unnecessary to nail the solar batteries to the roof bed with screws or the like.

17 Claims, 3 Drawing Sheets

SHEET-SHAPED SOLAR MODULE MOUNTING STRUCTURE

BACKGROUND OF THE INVENTION

This invention relates to a sheet-shaped solar module mounting structure for mounting sheet-shaped solar batteries on a roof bed.

In order to effectively utilize solar energy, sometimes a solar module is mounted on a roof bed. An example of the solar module is in the form of a sheet.

Heretofore, a sheet-shaped solar module is mounted on a roof bed by directly nailing the former to the latter with screws similarly as in the case of other sheet-shaped materials such as for instance roofing.

Heretofore, a sheet-shaped solar module is nailed onto a roof bed, and therefore rain may enter the house through the holes which are formed when the solar module is nailed onto the roof bed. In order to overcome this difficulty, various methods are employed; in one of the methods, the roof bed is increased in thickness, or in another method, a water-proof sheet is employed. However, those methods are disadvantageous in that it is rather troublesome to practice the methods.

In the use of a sheet-shaped solar module, the replacement and maintenance of the latter must be taken into account. In order to replace the old sheet-shaped solar module, it is necessary to remove the screws first, and then to remove the sheet-shaped solar module from the roof bed; and under this condition, it is required to lay a new sheet-shaped solar module over the roof bed, and then to nail the new sheet-shaped solar module with screws again. That is, the replacement of the sheet-shaped solar module is rather troublesome.

In nailing the sheet-shaped solar module onto the roof bed, the solar module may be nailed carelessly to impair the electric power generation thereof. Hence, the nailing work must be carried out with great care. In addition, the exposure of wiring materials at the ends of the sheet-shaped solar module is not acceptable in design.

SUMMARY OF THE INVENTION

In view of the foregoing, an object of the invention is to provide a sheet-shaped solar module mounting structure with which the sheet-shaped solar batteries are improved in water-proof characteristic, and are free from the difficulty that the electrical power generation thereof is impaired when nailed carelessly, and the replacement of the sheet-shaped solar module is achieved with ease, and the wiring members at the ends of the solar module are covered, thus being improved in design.

The foregoing object of the invention has been achieved by the provision of a sheet-shaped solar module mounting structure in which rail members have locking members for locking the end portions of sheet-shaped solar batteries.

More specifically, what has been provided by the invention is a sheet-shaped solar module mounting structure for mounting sheet-shaped solar batteries on a roof bed; in which a plurality of rail members are juxtaposed on the roof bed, and the sheet-shaped solar batteries are laid between the rail members, each of the rail members having locking members to lock the end portions of the sheet-shaped solar batteries.

With the sheet-shaped solar module mounting structure of the invention, the sheet-shaped solar batteries are mounted on the roof bed as follows: The rail members are nailed to the roof bed, and the sheet-shaped solar batteries are laid on the roof bed in such a manner that the end portions of the sheet-shaped solar batteries are locked to the locking members of the rail members.

The sheet-shaped solar module is replaced as follows: The end portions of the sheet-shaped solar module are disengaged from the locking members, and the sheet-shaped solar module is removed from the roof bed. Under this condition, a new sheet-shaped solar module is laid on the roof bed, and the end portions of the new sheet-shaped solar module are locked to the locking members.

As is apparent from the above description, in mounting the sheet-shaped solar batteries on the roof bed, they are not nailed thereto with screws or the like. Hence, no hole is formed in the sheet-shaped solar module, which improves the waterproof characteristic of the latter, and eliminates the difficulty that the electrical power generation is impaired when nailed carelessly. Furthermore, the replacement of the sheet-shaped solar module can be achieved with ease. Moreover, since the end portions of each of the solar batteries are locked to the locking members of the rail members, they are not exposed; that is, they are fine in design.

The sheet-shaped solar module mounting structure may be so designed that each of the rail members has mounting portions, which are nailed to the roof bed, and the nailed parts of the mounting portions are covered with the sheet-shaped solar batteries. With the structure, the rail members can be positively secured to the roof bed, and the nailed parts are covered with the sheet-shaped solar module. Hence, a water leak in the roof through the nailed parts are positively prevented.

Furthermore, the sheet-shaped solar module mounting structure may be so designed that the locking members are integral with the rail members, respectively, and are holding pieces which are adapted to hold the end portions of the sheet-shaped solar batteries. In this case, the number of components for mounting the sheet-shaped solar batteries can be reduced.

Moreover, in the sheet-shaped solar module mounting structure, the locking members may be rubber pads to press the end portions of the sheet-shaped solar batteries against the rail members. In this case, irrespective of the thickness of the sheet-shaped solar module, the latter can be locked, being positively pressed against the rail members.

DETAILED DESCRIPTION OF THE PREFERRED EMBODIMENTS

Figure 1:
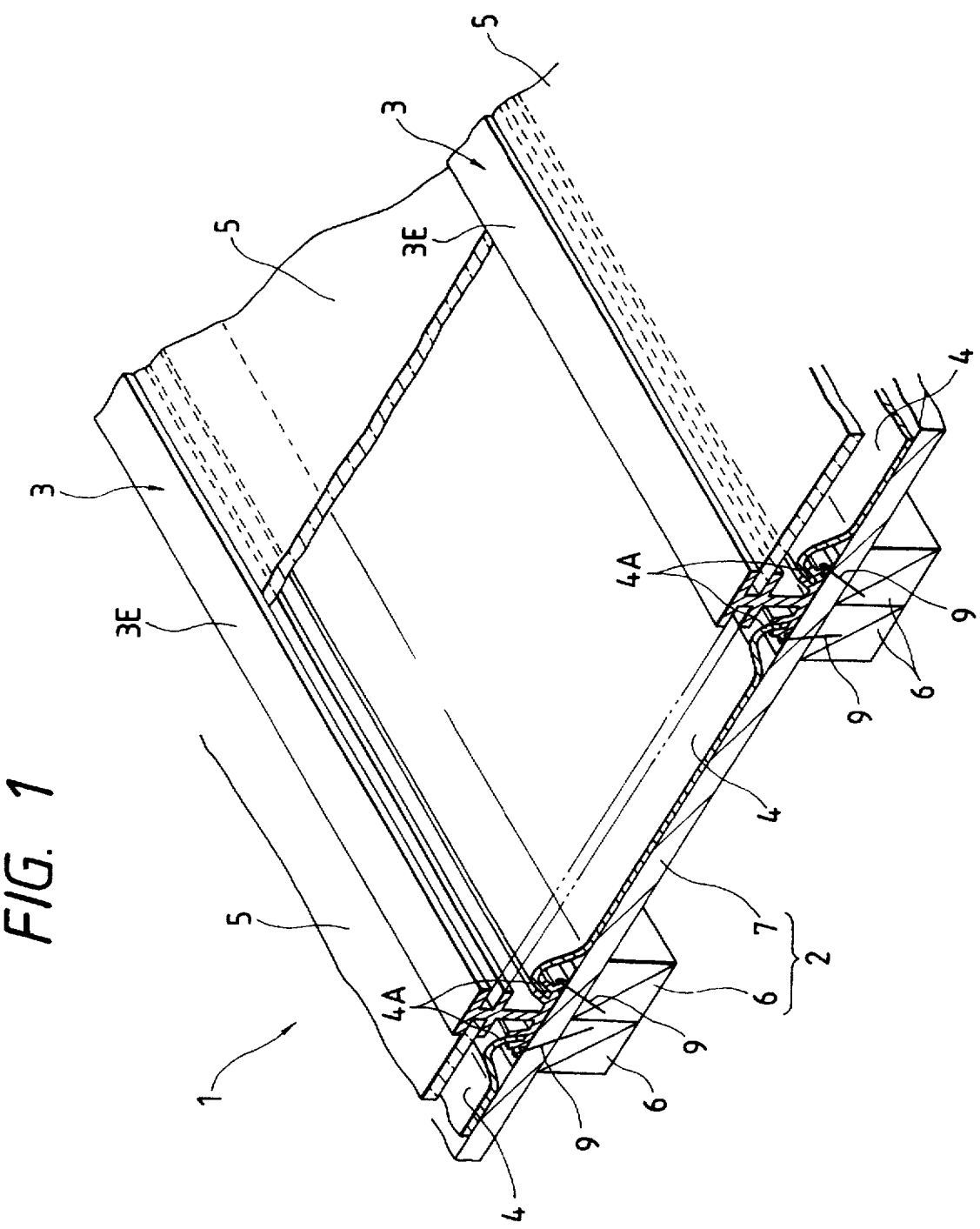
FIG. 1 is a perspective view of a sheet-shaped solar module mounting structure, which constitutes a first embodiment of the invention.

Preferred embodiments of the invention will be described with reference to the accompanying drawings in detail. In those embodiments, for simplification in description, like parts are designated by like reference numerals or characters.

(First Embodiment)

Figure 2:
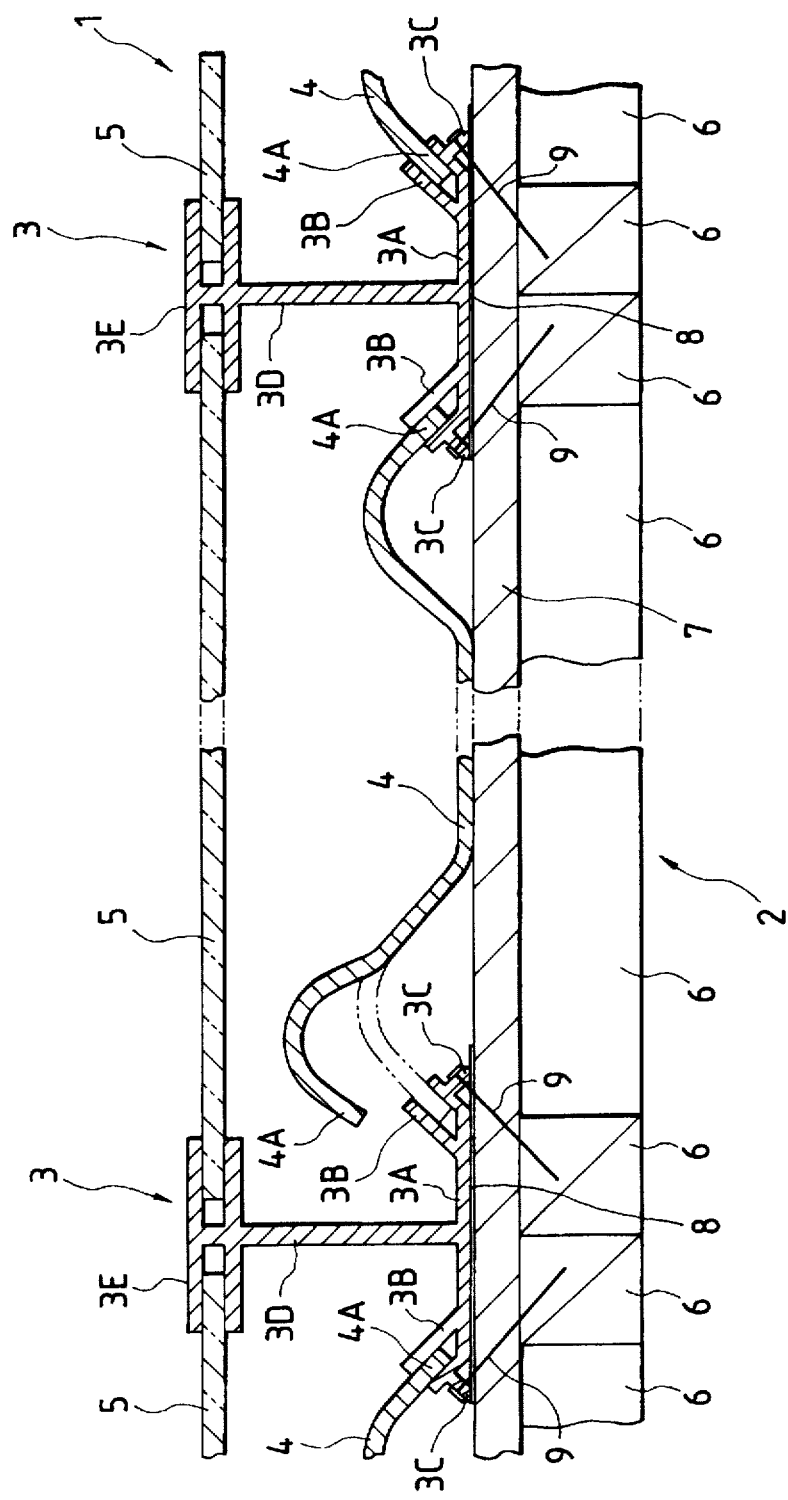
FIG. 2 is a vertical sectional view of the sheet-shaped solar module mounting structure shown in FIG. 1.

FIGS. 1 and 2 show the first embodiment of the invention.

In those figures, a roof 1 is made up of: a roof bed 2; a plurality of rail members 3 which are arranged on the roof bed 2 in the direction of inclination of the roof; sheet-shaped solar batteries 4 each of which is flexible and laid on the roof bed 2 between the rail members 3; and translucent surface members 5 fitted between the upper end portions of the adjacent rail members 3.

The roof bed 2 is such that plate members 7 are laid over panel members 6 which are arranged in the form of a grid.

Each of the rail members 3 comprises: a base portion 3A laid through a water-proof butyl tape 8 on the plate members 7; locking members 3B extended obliquely upwardly from both sides of the base portion 3A; mounting portions 3C provided below the locking members 3B; a rise portion 3D extended upwardly from the middle of the base portion 3a; and a surface member holding portion 3E at the top of the rise portion 3D. Those portions 3A through 3E are made of synthetic resin or aluminum, being provided as one unit.

Each of the locking members 3B is substantially U-shaped in section; that is, it is made up of a pair of holding pieces which hold one end portion 4A of the sheet-shaped solar module 4. The distance between the pair of holding pieces is substantially equal to the thickness of the end portion 4A of the sheet shaped solar module 4.

Each of the mounting portions 3C is a plate-shaped leg which is extended from the lower surface of the locking member 3B in such a manner that it is perpendicular to the latter. The mounting portions 3C are nailed to the plate member 7 with screws 9. Each of the screws 9 penetrates the mounting portion 3C, the water-proof butyl tape 8, and the plate member 7, thus reaching the panel member 6.

The nailed part of each of the mounting portions 3C is covered with the sheet-shaped solar module 4.

The surface member holding portion 3E is substantially U-shaped in section in order to hold the upper and lower surfaces of the surface member. The surface members 5 are glass plates.

In the first embodiment, the sheet-shaped solar batteries 4 are secured to the roof bed 2 as follows: First, the water-proof butyl tapes 8 are laid on the roof bed 2, and then the rail members 3 are arranged over the water-proof butyl tapes 8. Thereafter, the mounting portions 3C of the rail members 3 are nailed to the roof bed 2 with screws 9.

Under this condition, the sheet-shaped solar batteries 4 are laid on the roof bed 2, and the end portions 4A of the sheet-shaped solar batteries 4 are fixedly inserted into the locking members 3B (as indicated by the phantom lines in FIG. 2). Next, the surface members 5 are engaged with the surface member holding portions 3E of the rail members 3.

The sheet-shaped solar module 4 may be replaced as follows: First, the surface member 5 is disengaged from the surface member holding portions 3E of the rail members 3. Thereafter, the sheet-shaped solar module 4 is removed from the rail members 3 by disengaging its end portions 4A from the locking members 3B of the rail members 3. The sheet-shaped solar module 4 is removed from the roof bed 2, and instead a new sheet-shaped solar module 4 is laid on the roof bed 2. Under this condition, the end portions 4A of the new solar module 4 are fixedly inserted into the locking members 3B of the rail members 3, and the surface member 5 is engaged with the surface member holding portions 3E of the rail members 3.

In the first embodiment, (1) each of the rail members 3 has the locking members 3B to which the end portions 4A of the sheet-shaped solar module 4 are locked. Hence, in mounting the sheet-shaped solar batteries 4 on the roof bed 2, it is unnecessary to nail the sheet-shaped solar batteries 4 with screws. Hence, no hole is made in the sheet-shaped solar batteries 4. This feature improves the water-proof characteristic of the latter, and eliminates the difficulty that the electrical power generation is impaired when nailed carelessly. Furthermore, the replacement of the sheet-shaped solar module 4 can be achieved with ease. Moreover, since the end portions of each of the solar batteries are locked to the locking members 3B of the rail members 3, its appearance is fine in design.

Furthermore, in the first embodiment, (2) the rail members 3 have the mounting portions 3C, and the latter 3C are nailed to the roof bed 2 with the screws 9, and the parts of the mounting portions 3C which have been thus screwed are covered with the sheet-shaped solar batteries 4. Hence, the rail members 3 are positively mounted on the roof bed 2. Futhermore, the nailed parts of the mounting portions 3C are covered with the sheet-shaped solar batteries 4, which eliminates the difficulty that a water leak in the roof occurs through the nailed parts.

Moreover, in the first embodiment, (3) the water-proof butyl tapes are provided between the base portions 3A of the rail members 3 and the roof bed 2, so that a water leak in the roof through the mounting parts of the rail members 3 is prevented. In addition, (4) the end of each of the screws 9 fixing the rail members 3 is held in the panel member 6, which further enhances the water-proof effect.

Furthermore, (5) the locking members 3B are integral with the rail member 3, and serve as the holding pieces adapted to hold the end portions 4A of the sheet-shaped solar batteries 4, which decreases the number of components required for mounting the sheet-shaped solar batteries 4.

(Second Embodiment)

Now, the second embodiment of the invention will be described with reference to FIG. 3. The second embodiment is different from the first embodiment only in the arrangement of the rail member and its locking members.

Figure 3:
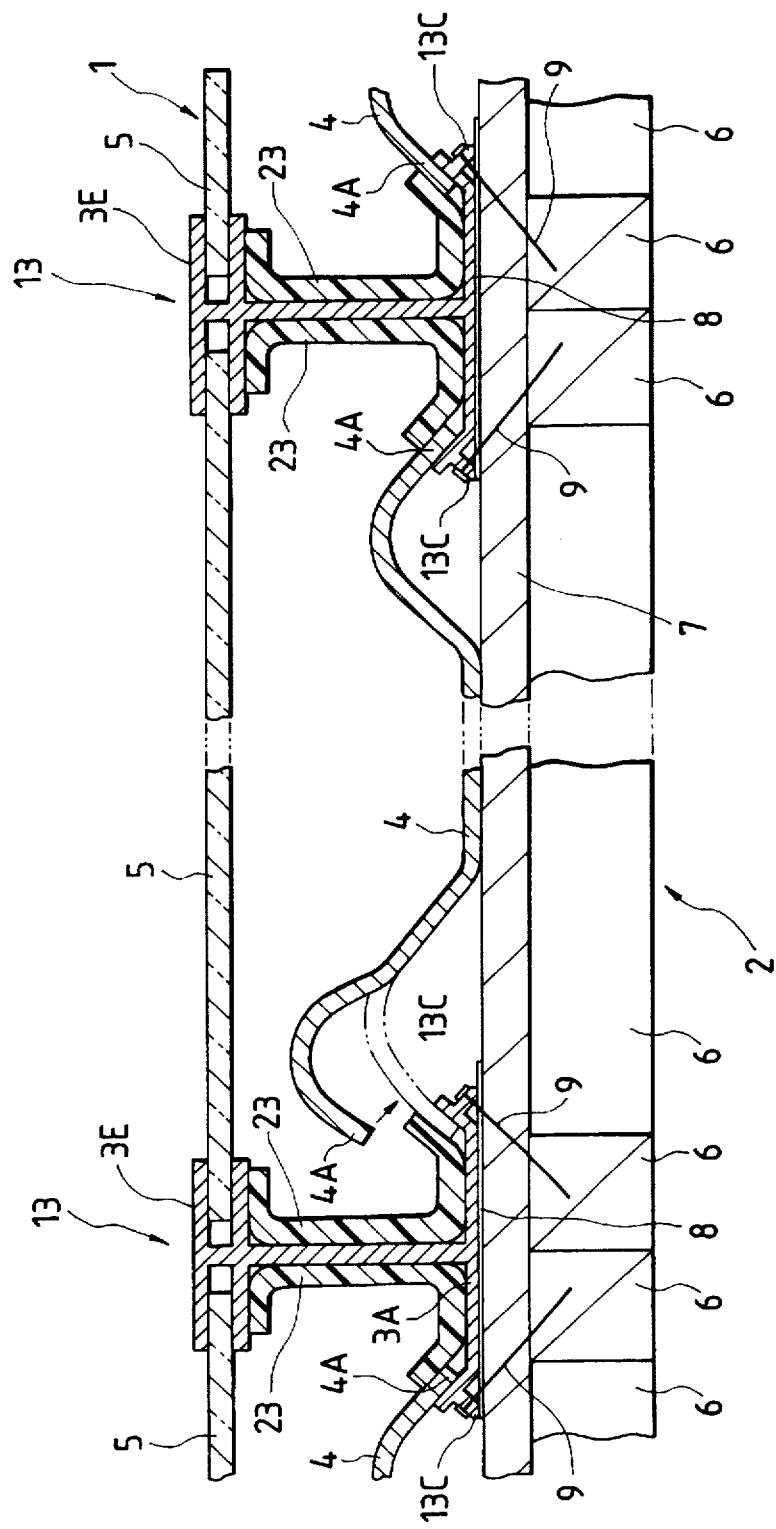
FIG. 3 is a vertical sectional view (corresponding to FIG. 2) showing another example of the sheet-shaped solar module mounting structure, which constitutes a second embodiment of the invention.

As shown in FIG. 3, a roof 11 is made up of: the aforementioned roof bed 2; a plurality of rail members 13 (only two rail members 13 shown) provided on the roof bed 2 in the direction of inclination of the roof; the aforementioned sheet-shaped solar batteries 4 laid on the roof bed 2 between the rail members 13; and the above-described surface members provided between the upper end portions of the rail members 13.

Each of the rail members 13 comprises: the aforementioned base portion 3A; a pair of mounting portion 13C extended on both sides of the base portion 3A; the aforementioned rise portion 3D extended from the middle of the base portion 3A; and the aforementioned surface member holding portion 3E at the top of the rise portion. Those portions 3A, 13C, 3D and 3E are made of synthetic resin or aluminum, thus being provided as one unit.

Each of the mounting portions 13C is made up of: a pair of plate-shaped portions which are obliquely upwardly extended from both ends of the base portion 3A; and a pair of plate-shaped legs which are extended downwardly from the lower surfaces of plate-shaped portions in such a manner that they are perpendicular to the latter, respectively. The mounting portions 13C are nailed to the roofing bed with the screws 9. The nailed parts of the mounting portions 13C are covered with the sheet-shaped solar module 4.

In the second embodiment, its locking members 23 are rubber pads to press the end portions 4A of the sheet-shaped solar batteries 4 against the mounting portions 13C of the rail members 13. Each of the locking members 23 is fitted in the base portion 3A, the mounting portion 13C, the rise portion 3D, and the surface member holding portion 3E of the rail member 13 which is U-shaped in section.

In the second embodiment, the sheet-shaped solar batteries 4 are mounted on the roof bed as follows: Similarly as in the case of the first embodiment, first the water-proof butyl tapes are laid on the roof bed 2, and then the rail members 13 are set on the water-proof butyl tapes 8, and the mounting portions 13C of the rail members, 13 are secured to the roof bed 2 with the screws 9. Under this condition, the sheet-shaped solar batteries 4 are laid on the roof bed 2, and the end portions 4A of each of the sheet-shaped solar batteries 4 are set on the mounting portions 13C, and the locking members 23, which are the rubber pads U-shaped in section, are fitted in the portions U-shaped in section of the rail members 13. Under this condition, the end portions 4A of the sheet-shaped solar batteries 4 are pressed against the mounting portions 13C by the locking members 23 (as indicated by the phantom lines in FIG. 3).

Thereafter, the surface members 5 are held with the surface member holding portions 3E of the rail members 13.

The sheet-shaped solar module is replaced as follows: Similarly as in the case of the first embodiment, the surface member 5 is disengaged from the surface member holding portions 3E of the rail members 13. And with the locking members 23 removed from the rail members 13, the sheet-shaped solar module 4 is removed. After the removal of the sheet-shaped solar module 4, a new sheet-shaped solar module 4 is secured to the roof bed 2 in the same manner as described above.

Hence, the second embodiment has the same effects or merits (1) through (4) as the first embodiment. In addition, with the second embodiment, the locking members 23 are the rubber pads which press the end portions 4A of the sheet-shaped solar batteries against the rail members 13. Hence, the sheet-shaped solar batteries 4 can be positively locked being pressed against the rail members 13 irrespective of the thickness thereof.

While there has been described in connection with the preferred embodiments of the invention, it will be obvious to those skilled in the art that various changes and modifications may be made therein without departing from the invention.

For instance, in the above-described first or second embodiment, each of the rail members 3 or 13 has the mounting portions 3C or 13C, and the mounting portions 3C or 13C are nailed to the roof bed, and the nailed parts of the mounting portions are covered with the sheet-shaped solar batteries 4. However, the invention is not limited thereto or thereby; that is, it is not always necessary that the structure is so designed that the mounting portions 3C or 13C are covered with the sheet-shaped solar batteries. That is, for instance, it may be so designed that the mounting portions 3C or 13C are eliminated, and the base portion 3A is directly nailed to or bonded to the roof bed 2.

Furthermore, it is not always required to provide the surface members (boards) 5. Even in the case where the surface members 5 are employed, it is not always necessary that they are translucent; for instance, they may be colored glass plates which block the solar heat.

As was described above, with the sheet-shaped solar module mounting structure of the invention, the rail members, with which the surface members are engaged, include the locking members to which the end portions of the sheet-shaped solar batteries are locked. Hence, in mounting the sheet-shaped solar batteries on the roof bed, it is unnecessary to nail the solar batteries to the roof bed with screws. This feature improves the water-proof characteristic of the sheet-shaped solar batteries, and eliminates the difficulty that the electrical power generation of the sheet-shaped solar batteries is impaired when nailed carelessly. Furthermore, the replacement of the sheet-shaped solar module can be achieved with ease. Moreover, the wiring members at the ends of the solar module are covered, thus being improved in design.

What is claimed is:

1. A sheet-shaped solar module mounting structure for mounting on a roof bed, said sheetshaped solar module mounting structure comprising:

a plurality of rail members for juxtaposed disposition on said roof bed, sheet-shaped solar batteries laid between said rail members and having end portions, and translucent surface members spaced above the sheet-shaped solar batteries and engaged with the rail members, wherein each of said rail members has locking members to lock the end portions of said sheet-shaped solar batteries.

2. The sheet-shaped solar module mounting structure of claim 1, wherein each of said rail members has mounting portions, which are to be nailed to said roof bed, said mounting portions being disposed below said sheet-shaped solar batteries.

3. The sheet-shaped solar module mounting structure of claim 1, wherein said rail members each have a one-piece construction, and wherein said locking members hold the end portions of said sheet-shaped solar batteries.

4. The sheet-shaped solar module mounting structure of claim 2, wherein said locking members are comprised of rubber pads to press the end portions of said sheet-shaped solar batteries against said mounting portions.

5. The sheet-shaped solar module mounting structure of claim 1, further comprising water proof butyl tapes for disposition between the rail members and the roof bed.

6. The sheet-shaped solar module mounting structure of claim 1, wherein each of said rail members is made of synthetic resin and has a one-piece construction.

7. The sheet-shaped solar module mounting structure of claim 1, wherein each of said rail members is made of aluminum and has a one-piece construction.

8. A solar module mounting structure for mounting on a roof bed, said solar module mounting structure comprising:

a sheet-shaped solar battery for disposition over the roof bed, said solar battery having opposing ends; and a pair of rail members respectively fastened to the ends of the solar battery, said rail members each including a base for disposal proximate to the roof bed, said bases each including:

a mounting portion adapted for securement to the roof bed;

a planar surface disposed parallel to the roof bed when the solar module mounting structure is mounted on the roof bed; and locking means for holding one of the ends of the solar battery such that the one of the ends is disposed at an oblique angle to the planar surface and such that the solar battery overlies the mounting portion.

9. The solar module mounting structure of claim 8 wherein the locking means comprise rubber pads to press the ends of the solar battery against the mounting portions.

10. The solar module mounting structure of claim 8 wherein the locking means comprise structures defining grooves that receive the ends of the solar battery.

11. The solar module mounting structure of claim 8, further comprising a translucent surface member spaced above the solar battery and having opposing ends.

12. The solar module mounting structure of claim 11, wherein the rail members each further comprise a holding portion, said holding portions engaging the opposing ends of the translucent surface member.

13. The solar module mounting structure of claim 11, wherein the translucent surface member is comprised of a glass plate.

14. A solar module mounting structure for mounting on a roof bed, said solar module mounting structure comprising:
 a sheet-shaped solar battery for disposition over the roof bed, said solar battery having opposing ends; and
 a pair of rail members respectively fastened to the ends of the solar battery, said rail members each including a base for disposal proximate to the roof bed, said bases each including:
  a mounting portion adapted for securement to the roof bed; and
  locking means for holding one of the ends of the solar battery, said locking means being at least partially provided by said mounting portion and holding said solar battery such that a first portion of the solar battery contacts the roof bed and a second portion of the solar battery is spaced from the roof bed when the solar module mounting structure is mounted to the roof bed.

15. The solar module mounting structure of claim 14, wherein the locking means comprise rubber pads to press the ends of the solar battery against the mounting portions.

16. The solar module mounting structure of claim 14, wherein the locking means comprise structures defining grooves that receive the ends of the solar battery.

17. The solar module mounting structure of claim 14 wherein the solar battery overlies the mounting portions.

\* \* \* \* \*